Jan. 23, 1951   J. H. FANCHER   2,538,901
APPARATUS FOR CUTTING PLATE GLASS
Filed July 2, 1949   4 Sheets-Sheet 1
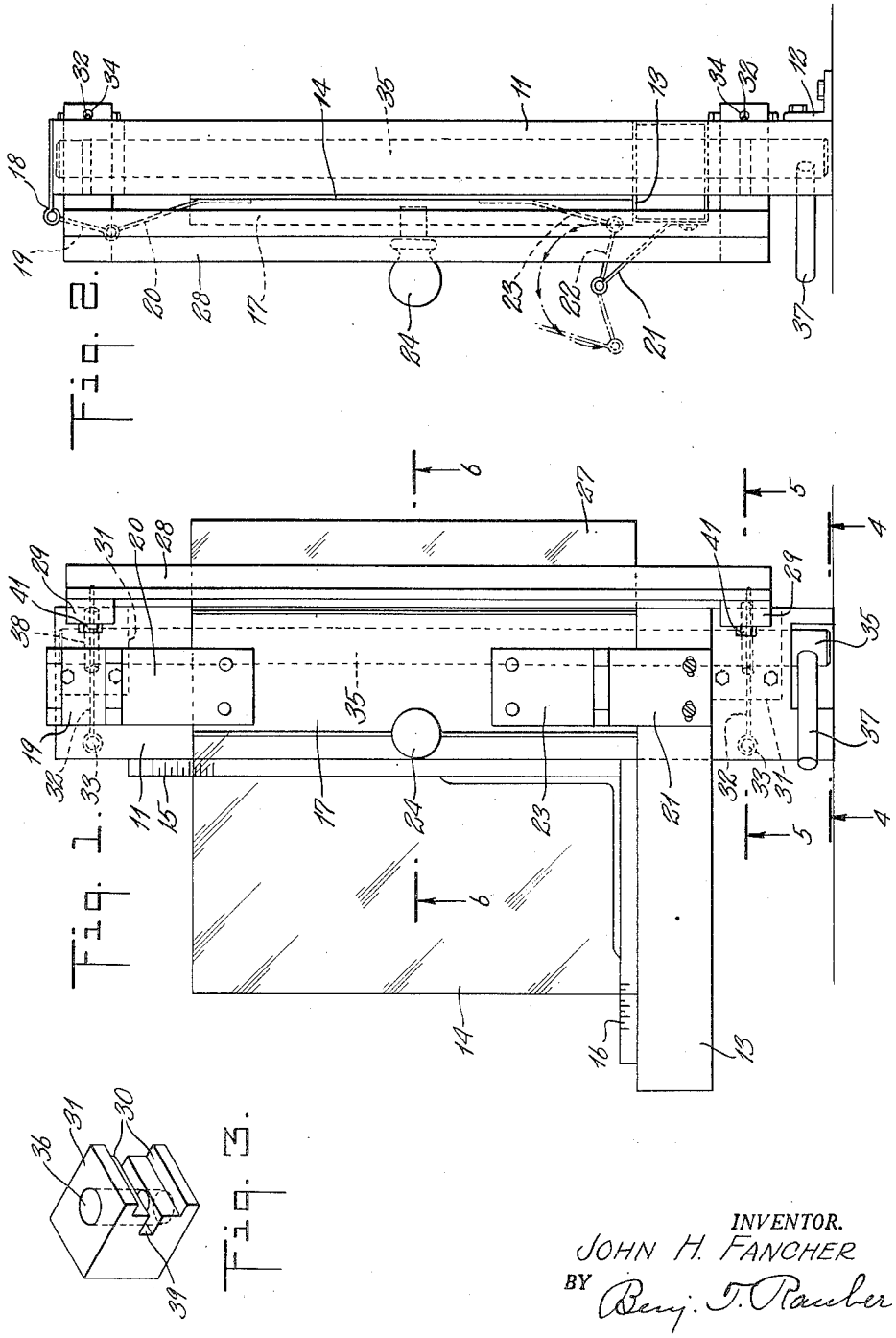
INVENTOR.
JOHN H. FANCHER
BY Benj. T. Rauber
ATTORNEY Jan. 23, 1951    J. H. FANCHER    2,538,901
APPARATUS FOR CUTTING PLATE GLASS
Filed July 2, 1949    4 Sheets-Sheet 2
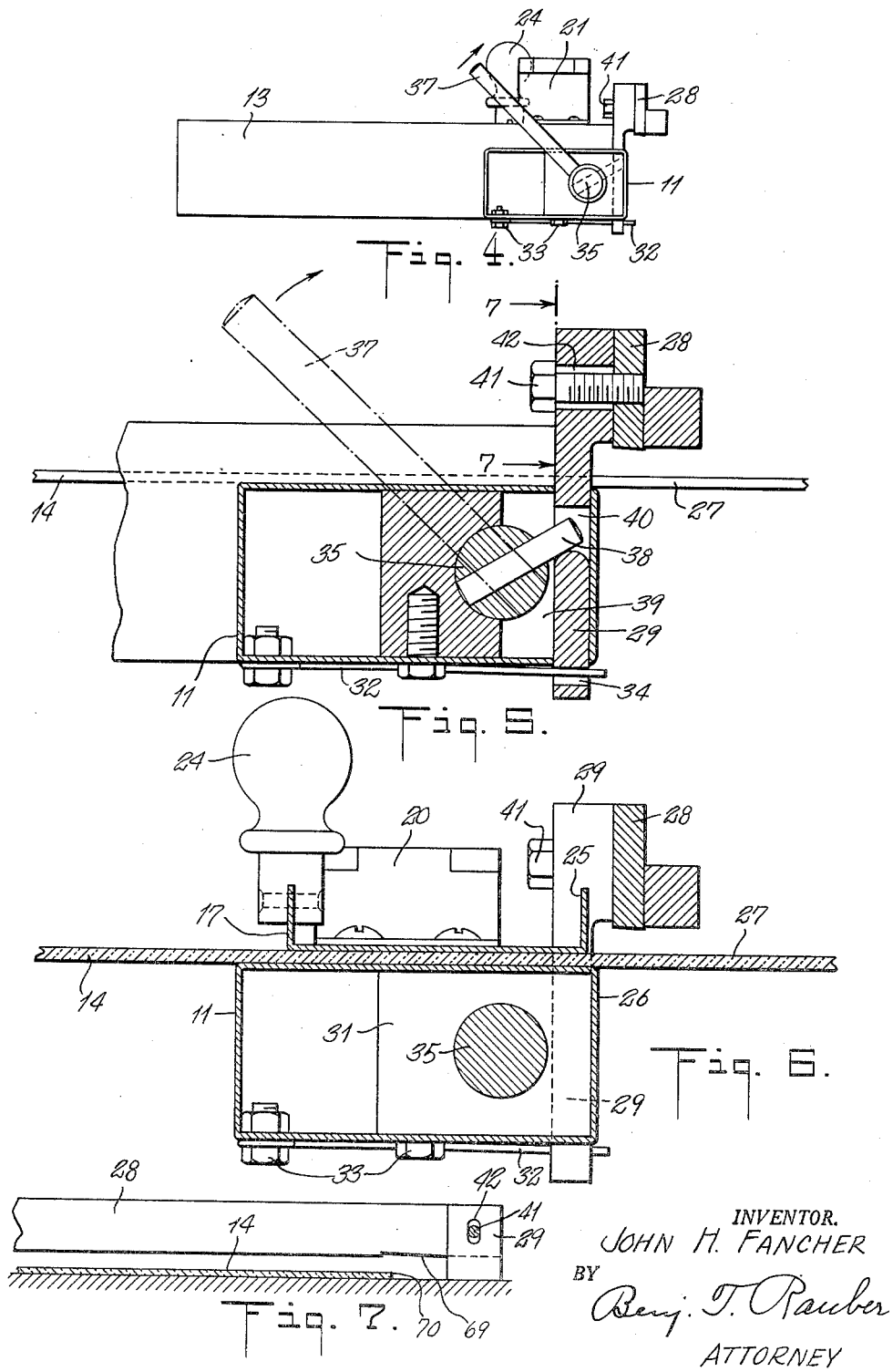
INVENTOR.
JOHN H. FANCHER
BY Benj. T. Rauber
ATTORNEY

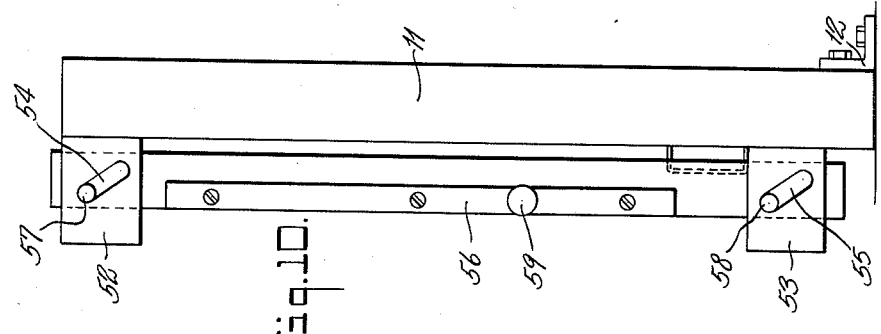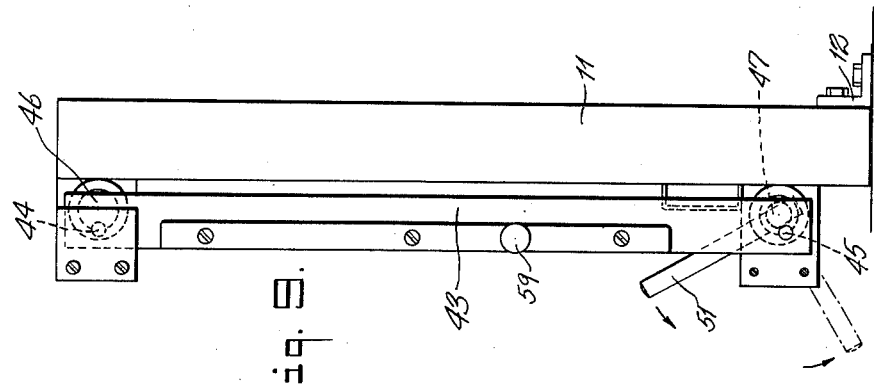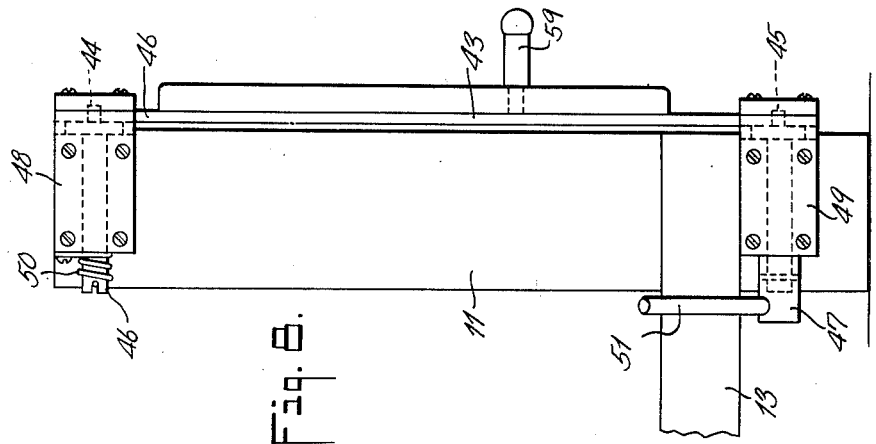

Jan. 23, 1951  J. H. FANCHER  2,538,901
APPARATUS FOR CUTTING PLATE GLASS
Filed July 2, 1949  4 Sheets-Sheet 4
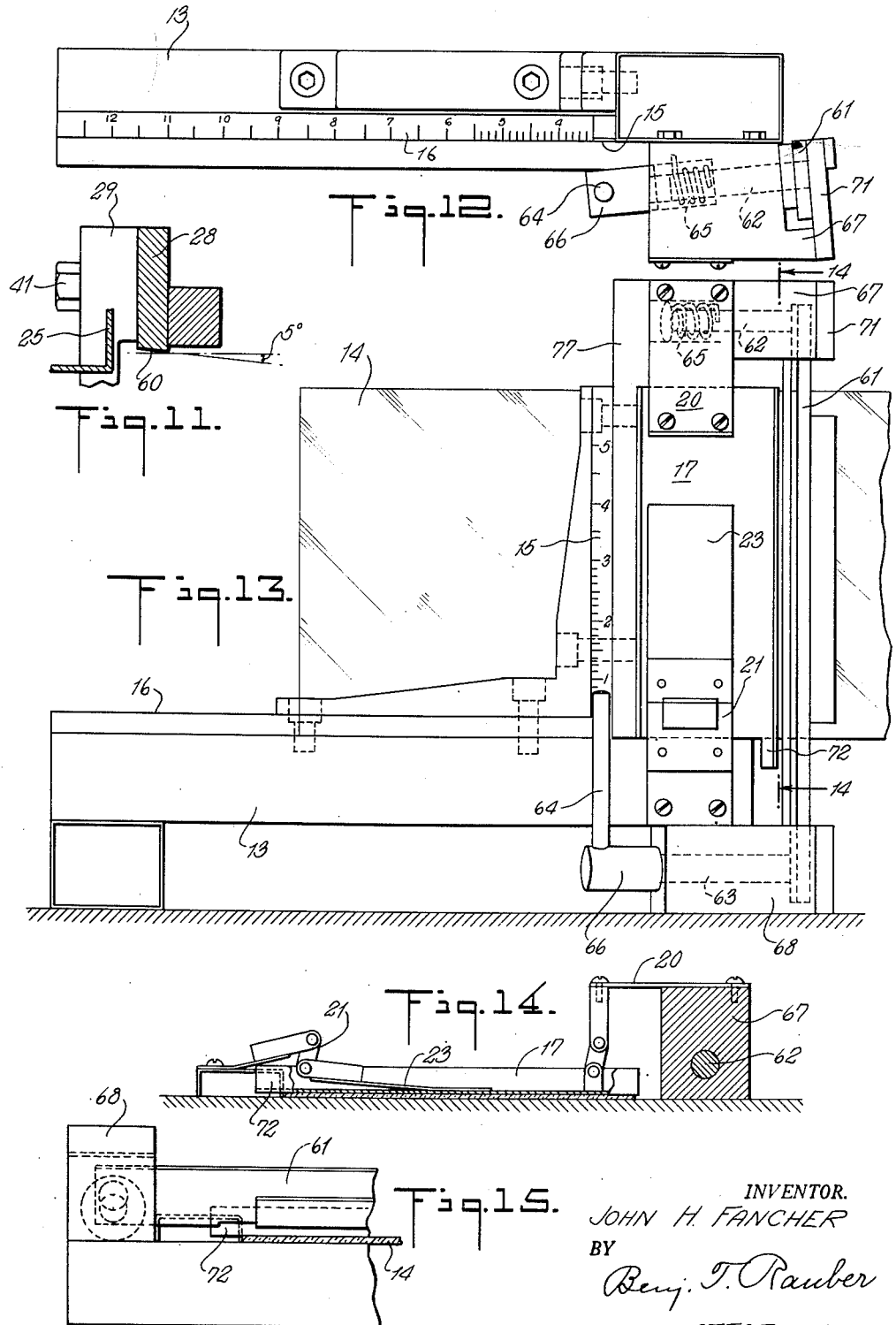
INVENTOR.
JOHN H. FANCHER
BY
Benj. T. Rauber
ATTORNEY Patented Jan. 23, 1951

2,538,901

UNITED STATES PATENT OFFICE 2,538,901

APPARATUS FOR CUTTING PLATE GLASS

John H. Fancher, Chatham, N. J., assignor to Red Devil Tools, Irvington, N. J., a corporation of New Jersey Application July 2, 1949, Serial No. 102,767

11 Claims. (Cl. 49—48)

My present invention relates to apparatus for the cutting of glass plates or sheets by scoring the plate or sheet with a glass cutter on a line and applying pressure to the glass on one side of the line.

It provides an apparatus whereby glass sheets or plates may be conveniently supported for scoring and pressure may be applied to sever the glass uniformly along the line and without chipping or irregularity.

The apparatus of my invention enables a very narrow margin, a small fraction of an inch for example, to be cut from a sheet.

In my invention I provide a horizontal support on which a sheet or plate of glass may be supported and a vertical support against which the sheet of glass may be held securely, and which also presents a straight edge so that glass projecting beyond it may be scored with a glass cutter and then severed.

The glass is severed along the scored line by means of a pressure bar which applies pressure initially to the projecting part of the sheet beyond the scored line near one edge or end thereof so as to start the breaking of the glass and in which this pressure then follows progressively lengthwise of the scored line. By applying pressure of the bar progressively along the scored line the glass follows a line of break which is continuous from one end of the scored line to the other, avoiding any tendency for the glass to break at different parts of the line as is frequently the case if pressure is applied all at once or uniformly throughout the entire length of the line of scoring. This is particularly true when a very short length is to be trimmed from a sheet of glass throughout a long severing line.

The various features of my invention are illustrated, by way of example, in the accompanying drawings in which Fig. 1 is a front view of the apparatus embodying my invention for holding a sheet of glass for cutting;

Fig. 2 is a vertical end elevation taken from the right of Fig. 1;

Fig. 3 is a detail perspective of a part of the apparatus shown in Figs. 1 and 2;

Figs. 4, 5 and 6 are bottom and sectional views of the apparatus taken on the lines 4—4; 5—5 and 6—6 of Fig. 1;

Fig. 7 is a vertical section taken on the line 7—7 of Fig. 5;

Fig. 8 is a front view, and Fig. 9 an end elevation of a cutting machine embodying another form of the invention;

Fig. 10 is an end view of a machine embodying still another modification;

Fig. 11 is a sectional view similar to that of Fig. 6 showing a modification of the form of cutting bar;

Fig. 12 is a plan view of another modification of the invention;

Fig. 13 is a front elevation of the modification shown in Fig. 12;

Fig. 14 is a vertical section taken on line 14—14 of Fig. 13;

Fig. 15 is a view similar to that of Fig. 7 of a modified form of cutting bar.

Referring more particularly to Figs. 1 to 7, the machine comprises a vertical support 11 which may be secured to a floor or table by means of brackets 12 and which carries a horizontal support 13 on which a plate or sheet 14 of glass may be supported on edge.

The upright and horizontal supports 11 and 13 may be provided with suitable scales or marks 15 and 16 for measuring the dimensions of the glass being cut.

The sheet or plate of glass is pressed against the vertical support 11 by means of a clamping plate 17 so hinged that it may be swung free of the glass resting against the vertical or upright support 11, or swung toward the support to clamp and press the glass securely against the upright support. For this purpose the clamping plate 17 is suspended from a bracket 18 at the top of the support 11 by means of a link 19 hinged at its lower end to an upwardly extending bracket or leaf 20 at the upper end of the clamping plate 17. Similarly at its lower end the clamping plate 17 is supported from a bracket 21 mounted on the horizontal support 13 and extending upwardly therefrom by means of a link 22 connected at one end to the bracket 21 and at its other end to a bracket 23 secured to the clamping plate.

The clamping plate is also provided with a knob or handle 24. By means of the knob 24 the clamping plate 17 may be moved upwardly and outwardly, the link 22 swinging on the arc, indicated in arrows in Fig. 2, while the link 19 swings clockwise until the clamping plate is entirely free from the upright support or of a plate or sheet of glass resting against it. In this position the glass may be moved freely along the horizontal support to the desired cutting position. Then the clamping plate may be swung in the opposite position whereby its weight will tend to wedge it against the glass holding the latter securely.

As shown particularly in Fig. 6, the forward edge 25 of the clamping plate is approximately superposed on the forward edge 26 of the upright support 11, or slightly within the edge 26, so that by drawing a glass cutter along the edge 25 it may be scored in substantial alignment with the edge 26 so that on bending it will turn on the latter edge. When thus supported and scored the back of the sheet, as indicated at 27, extending beyond the edge 26 may be severed from the sheet by a bending pressure applied in a direction to bend the sheet on the edge 26. This bending is accomplished by means of a breaker bar 28 extending vertically in front of the vertical support 11 and somewhat in advance of the edge 26 so that it may be brought against the projecting part 27 of the glass.

The breaker bar 28 is supported at its upper and lower ends by brackets 29 extending horizontally through grooves 30 in upper and lower blocks 31 mounted in the upright support 11. The bar 28 may thus slide or be transmitted to and press against the surface of the projecting part 27 of the glass as the brackets 29 slide in the grooves 30.

The breaker bar is normally pressed away from the surface of the glass by leaf springs 32 secured to the upright support 11 by means of screws 33 and extend through openings in the brackets 29 as shown in Fig. 5.

The breaker bars are moved to and pressed against the projecting part 27 of the glass by means of a manually rotatable shaft 35 extending vertically within the upright support 11 and journaled in its upper and lower ends in bearing openings 36 in the blocks 31.

The shaft 35 is rotatable manually by means of a crank arm 37 at the lower part of the shaft, which may be swung in an arc as indicated in Fig. 5.

The rotational movement of the shaft 35 is transmitted to the brackets 29 by means of a pin 38 secured in the shaft as shown in Fig. 5 and movable in an inner groove 39 of the block 31 to engage an opening 40 in its respective bracket 29.

It will be apparent that by swinging the arm 37 and the shaft 35 in the direction indicated in Fig. 5 the brackets 29 will be slid in their respective grooves to bring the edge of the breaker bar 28 against the projecting area 27 of the glass and to apply bending pressure to the latter.

The position of the breaker bar is such as to advance one end thereof slightly ahead of the other so that pressure will be applied near one edge and its application will proceed progressively toward the other edge. As the glass is generally and most conveniently scored by drawing the cutter downwardly along the edge 25 the scored line may not start at the upper edge of the glass but a slight distance below but yet always terminate at the bottom. Consequently it is desired to have the pressure of the breaker bar applied first at the bottom part of the glass. This may be accomplished by mounting the breaker bar to the lower bracket slightly nearer to the glass than it is mounted at the upper bracket and for this purpose to attach the breaker bar to the brackets 29 by means of screws 41 passing through openings 42, of somewhat larger diameter than the screws, so the position of the bar 28 may be adjusted relative to the brackets and then fixed by tightening the screws. This relationship is indicated diagrammatically in Fig. 7. Or the bracket at the lower end might be moved toward the glass somewhat in advance of the upper end by a suitable arrangement or positioning of the pins 38 relative to the shaft 35 and the openings 40.

It will be apparent, therefore, that on swinging the arm 37 the breaker bar will be advanced and pressed against the projecting part 27 of the glass and that this pressure will begin at one end, preferably the lower end, and proceed progressively upward to bend and sever the glass progressively from the lower edge to the upper.

In the modification shown in Figs. 8 and 9 the arrangement and positioning of the horizontal support 13 and the vertical support 11 and the clamping plate 17 may be the same as in the embodiment shown in Figs. 1 to 7.

In the embodiment shown in Figs. 8 and 9, a breaker bar 43 is mounted at its upper and lower ends on pins 44 and 45 extending axially from rotatable shafts 46 and 47 on which the pins are mounted eccentrically. The shafts are in turn rotatably mounted on brackets 48 and 49 extending forwardly from the upright supports 11. The upper shaft is held in a position to lift the breaker bar 43 upwardly and away from the upright support 11, as shown in Fig. 9, by means of a spring 50 secured at one end to the shaft 46 and at the other end to the bracket 48. The action of the spring in lifting the upper end of the breaker bar will also serve to swing the lower end upwardly and away from the glass. The lower shaft 47 may be rotated by means of a handle 51, as shown by the full line and dotted line positions in Fig. 9. This will swing the pin 45 and the lower end of the breaker bar 43 downwardly and rearwardly against the glass to apply breaking pressure thereto. It will also tend to pull downwardly the upper end of the breaker bar against the action of the spring 50 but this action will lag beyond that of the lower end of the bar so that the pressure will be applied first and with greatest force against the lower part of the glass and then proceed upwardly as the glass breaks along the scored line.

Fig. 10 illustrates another modification of the supporting and actuating means for the breaker bar. In this modification a pair of brackets 52 and 53 extend forwardly from the upright supports 11 and are provided with inclined slots 54 and 55. A breaker bar 56 is provided near its upper and lower ends with pins 57 and 58 projecting through the slots 54 and 55 and also with a manually operable knob or handle 59. The slots 54 and 55 are so inclined that when pressure is applied to the breaker bar 56 by means of the knob 59 to press it against the glass supported in the apparatus, pressure will be applied first and most strongly to the lower end of the breaker bar and will proceed progressively upwardly.

In applying pressure to that portion of the glass projecting beyond the cutting line, and particularly where the projecting portion is very narrow, it is advantageous to apply breaking pressure to the glass at a slight distance from the line of break. For this purpose the pressure edge of the breaking bar may be inclined at a slight angle, as for example about 5°, to the surface of the glass so as to make its first contact with the glass at a short distance from the scored breaking line. This may be accomplished as shown in Fig. 11 by beveling a breaker bar, such as that illustrated in Figs. 1 to 6 inclusive, as at 60. Accordingly the pressure will be applied at a distance from the scored line equal to the width of the breaker bar 28. Or, if the projecting part of the glass sheet is less than this distance it will be applied to the free edge of the projecting part of the glass.

In the modification shown in Figs. 12, 13 and 14, the supporting and clamping elements are substantially the same as those shown in Figs. 1, 8 and 9, and corresponding elements have been indicated with corresponding reference numerals.

In the modification shown in Figs. 12 to 15, a breaker bar 61 is mounted so that its pressure edge is inclined at a small angle, as for example about 5° to the plane of the glass to be cut. For this purpose it is mounted at its upper and lower ends in eccentrics 62 and 63 respectively, the axes of rotation of each being inclined at a corresponding angle to the plane of the glass. The lower eccentric 63 is rotated by a handle 64 in a manner similar to that of the modification of Figs. 8 and 9. The rotation of the upper eccentric 62 is restrained by means of a spring 65 engaged at one end in a slot in the end of the eccentric 62 and at the opposite end in a rotatable shaft 66 which may be rotated and set at a given position to adjust the tension on the spring 65.

The eccentrics 62 and 63 are mounted in bearing blocks 67 and 68 respectively at the upper and lower ends of the vertical support 11. It is apparent, therefore, that upon turning the handle 64 and rotating the eccentric 63, the lower part of the breaker bar will be pressed against the projecting end of the glass and will make contact with the latter at a short distance from the line on which the glass is scored to be cut. The rotation of the upper eccentric 62 will follow that of the lower eccentric being retarded or restrained by the action of the spring 65.

To avoid a tendency to chip the glass at its lower edge, it is desirable to apply the bending or breaking pressure a short distance above the lowermost edge of the glass. For this purpose the breaker bar is notched or cut back to a level just slightly above the lower edge of the glass. This is indicated in the modification shown in Fig. 7 by the notch 69 which extends beyond the lowermost edge 70 of the glass. Similarly in the modification shown in Figs. 12 to 15 the breaker bar 61 is provided with a blade 71 which extends just short of the lower edge of the glass so that it applies pressure not to the lowermost edge but slightly above it, thus avoiding chipping by contact with the lower edge.

In the modification shown in Figs. 12 to 15 the clamping plate has a downward extension 72 below the lowermost edge of the glass to insure adequate clamping throughout the length of the glass and also to provide a further extension of the edge on which the glass cutter is moved and thereby insuring accuracy to the extreme lower edge of the glass.

Through the above invention an apparatus is provided whereby a sheet of glass of large area, or small area, may be secured in position and scored and under breaking pressure severed along the scored line so as to start the break near one edge and move progressively upwardly. In this way there is no tendency for the glass to start on several breaks at the same time. Narrow strips of a small fraction of an inch have been severed in a continuous line from one end to the other giving a clean break.

Having described my invention, what I claim is:

1. Glass cutting apparatus which comprises a horizontal support on which a sheet of glass may rest on edge, an upright support having a vertical edge, a clamping means to clamp the sheet of glass resting on said horizontal support against said vertical support, a breaker bar mounted to move against a portion of glass extending beyond said vertical edge and means to move said breaker bar at one end against said glass in advance of the movement of the opposite end.

2. Glass cutting apparatus which comprises a horizontal support on which a sheet of glass may rest on edge, a vertical support, a clamping means to clamp the sheet of glass resting on said horizontal support against said vertical support, a breaker bar and means mounted on said upright support to move said breaker bar at the lower end against said glass in advance of the movement of the upper end of said breaker bar.

3. The apparatus of claim 1 in which said means to move said breaker bar comprises an upright rock shaft mounted in said upright support and having vertically spaced arms engaging said breaker bar with the lower end of said breaker bar advanced angularly to the upper end of said breaker bar relative to said rock shaft.

4. Glass cutting apparatus which comprises a horizontal support on which a sheet of glass may rest on edge, an upright support having a vertical edge, a clamping means to clamp a sheet of glass resting on said horizontal support against said upright support, a breaker bar having horizontal brackets slidable in said upright support and a vertical rock shaft having arms to engage said brackets in position with one edge of said breaker bar advanced angularly relative to said rock shaft.

5. The apparatus of claim 4 in which said upright support has grooved blocks in which said brackets are slidably engaged.

6. Glass cutting apparatus which comprises a horizontal support on which a sheet of glass may rest on edge, an upright support having a vertical edge, means to clamp a sheet of glass resting on said horizontal support against said upright support, a breaker bar, a pair of horizontal vertically spaced rock shafts on said vertical support, pins mounted eccentrically on said rock shaft and projecting to engage said breaker bar at vertically spaced distances, and means to rotate one of said rock shafts to advance said breaker bar against said glass.

7. The apparatus of claim 6 having a spring to retard the movement of the other of said rock shafts.

8. Glass cutting apparatus which comprises a horizontal support on which a sheet of glass may rest, an upright support having a vertical edge, a clamping means to clamp the sheet of glass resting on said horizontal support against said upright support, said upright support having a pair of inclined slots at vertically spaced positions, a breaker bar spaced beyond said vertical edge and pins on said breaker bar slidable in said slots.

9. The glass cutting apparatus of claim 1 in which the pressure edge of said breaker bar is inclined to contact the projecting part of the glass at a distance beyond the vertical edge of said upright support.

10. The apparatus of claim 1 in which the breaker bar is notched at its advancing end to engage the glass at a short distance from its edge.

11. The apparatus of claim 6 in which said rock shafts are inclined at a slight angle toward the projecting end of said glass.

JOHN H. FANCHER.

REFERENCES CITED

The following references are of record in the file of this patent:

UNITED STATES PATENTS

| Number | Name | Date |
|---|---|---|
| 787,122 | Semmer | Apr. 11, 1905 |
| 2,013,216 | McCarthy | Sept. 3, 1935 |
| 2,174,183 | Shaw | Sept. 26, 1939 |